US007151264B2

(12) United States Patent
Ehlers, Sr.

(10) Patent No.: US 7,151,264 B2
(45) Date of Patent: Dec. 19, 2006

(54) INLINE AIR HANDLER SYSTEM AND ASSOCIATED METHOD OF USE

(75) Inventor: Gregory Allen Ehlers, Sr., Newport Richey, FL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 227 days.

(21) Appl. No.: 10/905,208

(22) Filed: Dec. 21, 2004

(65) Prior Publication Data
US 2006/0131511 A1   Jun. 22, 2006

(51) Int. Cl.
*C02F 1/32* (2006.01)
(52) U.S. Cl. ...................... 250/373; 210/748
(58) Field of Classification Search ............... 250/373; 210/748, 85
See application file for complete search history.

(56) References Cited

U.S. PATENT DOCUMENTS

| | | | |
|---|---|---|---|
| 4,531,508 A | | 7/1985 | Niknejad et al. |
| 5,042,997 A | | 8/1991 | Rhodes |
| 5,428,964 A | | 7/1995 | Lobdell |
| 5,531,801 A | | 7/1996 | Sewell et al. |
| 5,616,172 A | * | 4/1997 | Tuckerman et al. ........... 96/16 |
| 5,772,732 A | | 6/1998 | James et al. |
| 5,830,058 A | * | 11/1998 | Røsj.ø ....................... 454/187 |
| 5,901,566 A | | 5/1999 | Macosko et al. |
| 5,993,738 A | * | 11/1999 | Goswani ....................... 422/22 |
| 6,535,838 B1 | | 3/2003 | Abraham et al. |
| 6,569,518 B1 | | 5/2003 | Yadav et al. |
| 6,680,028 B1 | | 1/2004 | Harris |
| 6,755,035 B1 | | 6/2004 | McNamara et al. |
| 6,765,396 B1 | | 7/2004 | Barror |
| 6,818,177 B1 | * | 11/2004 | Turcotte ....................... 422/24 |
| 2004/0075065 A1 | | 4/2004 | Spivak |
| 2005/0269254 A1 | * | 12/2005 | Roitman ....................... 210/252 |
| 2006/0101838 A1 | * | 5/2006 | Ritchey ....................... 62/285 |
| 2006/0131246 A1 | * | 6/2006 | Ehlers, Sr. ................... 210/748 |
| 2006/0177356 A1 | * | 8/2006 | Miller ....................... 422/121 |

OTHER PUBLICATIONS

Kronos Advanced Technologies, Inc., KRONOS faq: q & a, http://www.kronosati.com/faq.html, 2003, 5 pgs., Kronos Advanced Technologies, Inc., 464 Common Street, Suite 301, Belmont, Massachusetts, 02478-2570.

(Continued)

*Primary Examiner*—Otilia Gabor
(74) *Attorney, Agent, or Firm*—Leydig, Voit & Mayer, Ltd

(57) ABSTRACT

An inline air handler system and associated method of use is disclosed. This includes a member, at least one sensor operatively attached to the member, at least one ultraviolet light operatively attached to the member, at least one electronic input device, at least one electronic output device, a control unit, which includes a processor, that is electronically in communication with the at least one sensor, the at least one ultraviolet light, the at least one electronic input device and the at least one electronic output device, a water purification mechanism that includes an ultraviolet radiation chamber to allow water to flow between the inlet and the outlet through the ultraviolet radiation chamber and the ultraviolet radiation chamber can be positioned adjacent to at least one ultraviolet light. The air filtration unit and the member are positioned in a chamber located within a heating, ventilation, evaporative cooling and/or air conditioning system.

49 Claims, 6 Drawing Sheets

OTHER PUBLICATIONS

Kronos Advanced Technologies, Inc., KRONOS Corporate Contact Information, http://www.kronosati.com/contact.html, 2003, 1 pg., Kronos Advanced Technologies, Inc., 464 Common Street, Suite 301, Belmont, Massachusetts, 02478-2570.

Kronos Advanced Technologies, Inc., KRONOS technology: silent, http://www.kronosati.com/techsilent.html, 2003, 1 pg., Kronos Advanced Technologies, Inc., 464 Common Street, Suite 301, Belmont, Massachusetts, 02478-2570.

Kronos Advanced Technologies, Inc., KRONOS technology:clean, http://www.kronosati.com/techclean.html, 2003, 1 pg., Kronos Advanced Technologies, Inc., 464 Common Street, Suite 301, Belmont, Massachusetts, 02478-2570.

Kronos Advanced Technologies, Inc., KRONOS technology:adaptable, http://www.kronosati.com/techadapt.html, 2003, 1 pg., Kronos Advanced Technologies, Inc., 464 Common Street, Suite 301, Belmont, Massachusetts, 02478-2570.

Kronos Advanced Technologies, Inc., KRONOS technology: reliable, http://www.kronosati.com/techrel.html, 2003, 1 pg., Kronos Advanced Technologies, Inc., 464 Common Street, Suite 301, Belmont, Massachusetts, 02478-2570.

Kronos Advanced Technologies, Inc., KRONOS technology: overview, http://www.kronosati.com/technology.html, 2003, 1 pgs., Kronos Advanced Technologies, Inc. 464 Common Street, Suite 301, Belmont, Massachusetts, 02478-2570.

III-N Technology, Inc.; Welcome to 3N Technology, http://www.3n-tech.com, 2005, 2 pgs., III-N Technology, Inc., 3n@3-tech.com.

III-N Technology, Inc.; Nitride LEDs, http://www.3n-tech.com/nitride_led)on_si.htm, 2005, 2 pgs., III-N Technology, Inc., 3n@3-tech.com.

III-N Technology, Inc.; Contact Info, http://www.3n-tech.com/contact_info.htm, 2005, 1 pg., III-N Technology, Inc. 3n@3-tech.com.

III-N Technology, Inc.; III-N Microdisplay, http://www.3n-tech.com/iii-n_microdisplay.htm, 2005, 2 pgs., III-N Technology, Inc., 3n@3-tech.com.

\* cited by examiner

INLINE AIR HANDLER SYSTEM AND ASSOCIATED METHOD OF USE

BACKGROUND OF THE INVENTION

In the past, there has been a desire to determine what was present in the air within a building produced by a heating, ventilation and air conditioning ("HVAC") system. This includes, but is not limited to, bio-toxins, bacteria, spores, viruses, flammable vapors, carbon monoxide (CO), carbon dioxide ($CO_2$), NOx (which is a generic term for the various oxides produced during combustion), radon, and smoke. It was also desirable to ascertain the air temperature and the humidity. This required a number of individual sensors positioned within the premises. Each sensor utilized a separate electronic control system and there is no coordination and control of this information. Therefore, to monitor a number of factors is a very costly proposition. Also, depending on where the sensor was positioned could provide starkly different results.

Another problem is that biohazards are present in the air as well as in the drinking water. A significant issue is that viral or bacterial toxins can be recirculated within a building with an HVAC system so that eventually everyone working or living within the premises is eventually affected. Also, bacteria or viruses can be in the water supply regardless of the quality of the water supplied by the processing plant since bacteria and viruses can be introduced through the plumbing.

Yet another problem is that the filtration currently utilized with existing HVAC systems do not provide any indication as to when they are blocked or no longer working effectively.

The present invention is directed to overcoming one or more of the problems set forth above.

SUMMARY OF INVENTION

In one aspect of this invention, an inline air handler system is disclosed. This includes a member, at least one sensor operatively attached to the member, at least one ultraviolet light operatively attached to the member, at least one electronic input device, at least one electronic output device, a control unit, which includes a processor, that is electronically in communication with the at least one sensor, the at least one ultraviolet light, the at least one electronic input device and the at least one electronic output device, and an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof.

In another aspect of this invention, an air filtration unit is disclosed. The air filtration unit is selected from the group consisting of paper, fibrous, foam, electronic, passive electrostatic, active electrostatic and ionic types of filters.

Still another aspect of this invention is that at least one sensor is disclosed. The at least one sensor is selected from the group consisting of a humidity sensor, a bio-toxin sensor, a bacteria sensor, a spore sensor, a virus sensor, a flammable vapor sensor, a carbon monoxide sensor, a carbon dioxide sensor, a NOx sensor, a radon sensor, a smoke detector, a static pressure sensor, a vacuum sensor, a volumetric flow sensor and a temperature sensor.

Another aspect of this invention is that a water purification mechanism is disclosed. The water purification mechanism includes an inlet, an ultraviolet radiation chamber, and an outlet, wherein the inlet is connected in fluid relationship to the ultraviolet radiation chamber and the outlet is connected in fluid relationship to the ultraviolet radiation chamber to allow water to flow between the inlet and the outlet through the ultraviolet radiation chamber, wherein the ultraviolet radiation chamber is positioned adjacent to the at least one ultraviolet light.

In another aspect of this invention, an ultraviolet radiation chamber can be a transparent jacket with the at least one ultraviolet light located within the transparent jacket.

Yet another aspect of this invention, an ultraviolet radiation chamber includes a first manifold connected between the inlet and the ultraviolet radiation chamber and a second manifold connected between the ultraviolet radiation chamber and the outlet.

It is an aspect of this invention to receive output through an output device selected from the group consisting of an electronic display and audible alarm, wherein the electronic display is in electronic communication with the control unit in a group consisting of wired, portable and/or wireless communication.

Still another aspect of this invention is to provide input through an input device selected from the group consisting at least one pushbutton, voice recognition, an electronic thermostat, a television set interface, a security alarm display, a global computer network enabled appliance, telephone, personal digital assistant, home control interface and a Wireless Application Protocol (WAP) enabled device.

It is another aspect of this invention to provide electronic communication from a control unit to an input device and an output device through a network.

Yet another aspect of the present invention is to provide electronic communication from a control unit to an input device and an output device through wireless communication.

Another aspect of the present invention is to provide a network selected from the group consisting of a local area network or a wide area network and a network communication architecture selected from the group consisting of point-to-point, star, mesh or star-mesh utilizing protocols selected from the group consisting of proprietary, Internet, contention, polled or derivatives thereof.

Still another aspect of the present invention is to position the at least one sensor within the air filtration unit where preferably, but not necessarily, the at least one sensor utilizes nanotechnology.

In yet another aspect of the present invention, an inline air handler system is disclosed. The inline air handler system includes a member, at least one sensor operatively attached to the member, at least one ultraviolet light operatively attached to the member, at least one electronic input device, at least one electronic output device, a control unit, which includes a processor, that is electronically in communication with the at least one sensor, the at least one ultraviolet light, the at least one electronic input device and the at least one electronic output device, a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber to allow water to flow between the inlet and the outlet through the ultraviolet radiation chamber, wherein the ultraviolet radiation chamber is positioned adjacent to the at least one ultraviolet light, and an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof.

Still yet other aspect of the present invention, a method for utilizing an inline air handler system is disclosed. This method includes utilizing at least one sensor operatively attached to a member, utilizing at least one ultraviolet light operatively attached to the member, providing input through at least one electronic input device, filtering air through an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof, and receiving output with at least one electronic output device, wherein a control unit, which includes a processor, is electronically in communication with the at least one sensor, the at least one ultraviolet light, the at least one electronic input device and the at least one electronic output device.

In still another aspect of the present invention, a method for utilizing an inline air handler system is disclosed. This method includes utilizing at least one sensor operatively attached to a member, wherein the at least one sensor is selected from the group consisting of a humidity sensor, a bio-toxin sensor, a bacteria sensor, a spore sensor, a virus sensor, a flammable vapor sensor, a carbon monoxide sensor, a carbon dioxide sensor, a NOx sensor, a radon sensor, a smoke detector, a static pressure sensor, a vacuum sensor, a volumetric flow sensor and a temperature sensor, utilizing at least one ultraviolet light operatively attached to the member, providing input through at least one electronic input device, filtering air through an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof, and the air filtration unit is selected from the group consisting of paper, fibrous, foam, electronic, passive electrostatic, active electrostatic and ionic types of filters, receiving output from at least one electronic output device, wherein a control unit, which includes a processor, is electronically in communication with the at least one sensor, the at least one ultraviolet light, the at least one electronic input device and the at least one electronic output device, and filtering water through a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber thereby allowing water to flow between the inlet and the outlet through the ultraviolet radiation chamber, wherein the ultraviolet radiation chamber is positioned adjacent to the at least one ultraviolet light.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention.

Figure 1:
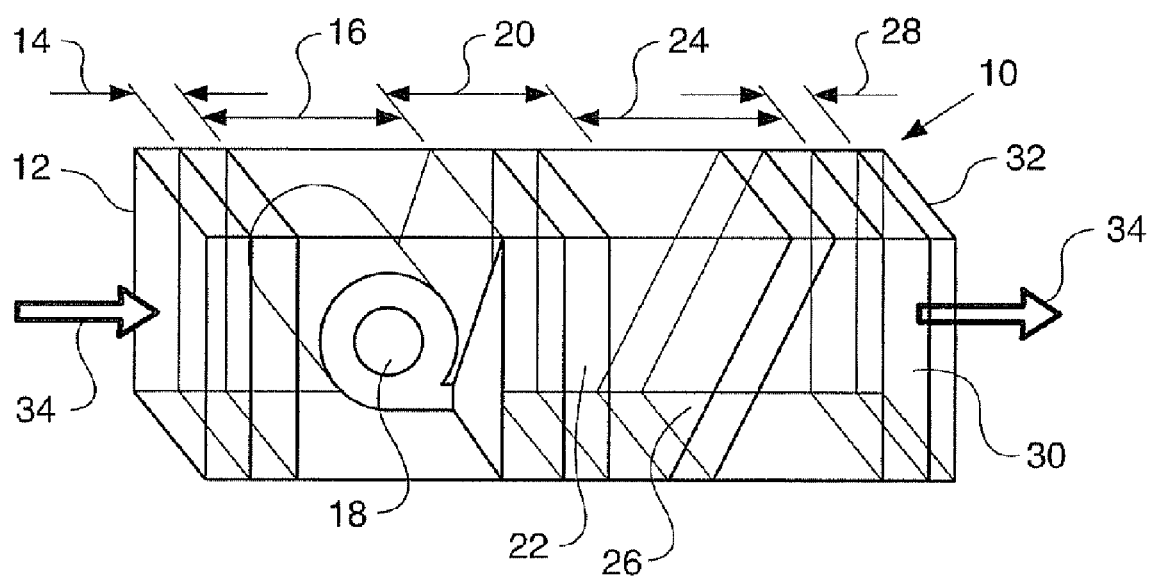
FIG. 1 is a cut-away, schematic view of an inline air handler system in accordance with the present invention.

Referring now to the drawings, and initially to FIG. 1, a preferred heating, ventilation and air conditioning ("HVAC") system that can be utilized for the inline air handler system of the present invention is generally indicated by numeral 10. The initial component is the return air plenum 12 for receiving air into the HVAC system 10. A plenum is a separate space provided for air circulation within the HVAC system 10. The return air then passes into a chamber 14. The chamber 14 is located on the intake of the HVAC system 10 and is designed to filter and sense the air prior to any interaction with other components of the HVAC system 10 in accordance with the present invention. However, this Invention is equally applicable to separate systems for heating, ventilation, evaporative cooling and air conditioning, as well as any combination thereof.

The air then enters a driven air chamber 16 that preferably, but not necessarily, includes an air propulsion mechanism 18, e.g., motor-blower. The air propulsion mechanism 18 is a means for moving air. The air propulsion mechanism 18 moves air from the return air plenum 12 through the HVAC system 10 and back into the building or premises. The air then comes off the air propulsion mechanism 18 and passes into a heating chamber 20. The heating chamber 20 preferably, but not necessarily, includes a gas-fired heating unit 22 that is utilized to heat indoor air. An illustrative, but nonlimiting, example of a gas-fired heating unit 22 and an air propulsion mechanism 18 are disclosed in U.S. Pat. No. 4,531,508, which issued to Niknejad et al. on Jul. 30, 1985, which is hereby incorporated by reference. The air propulsion mechanism 18 is not necessarily a fan-type unit and can be a fanless device that utilizes particle acceleration such as that produced under the trademark KRONOS™, by Kronos Advanced Technologies, Inc., having a place of business at 464 Common Street, Suite 301, Belmont, Mass. 02478-2570.

Air from the heating chamber 20 then passes into a cooling chamber 24. The cooling chamber 24 preferably, but not necessarily, includes an evaporator coil 26. The evaporator coil 26 provides cooling for air conditioning. The evaporator coil 26 can also provide heating when utilized in conjunction with a heat pump system (not shown). An illustrative, but nonlimiting, example of an evaporator coil 26 is disclosed in U.S. Pat. No. 6,755,035, which issued to McNamara et al. on Jun. 29, 2004, which is hereby incorporated by reference.

There is an auxiliary heating chamber 28 when the heat pump system is utilized. Preferably, but not necessarily, this includes resistive heating elements 30. An illustrative, but nonlimiting, example of resistive heating elements 30 include that disclosed in U.S. Pat. No. 5,901,566, which issued to Macosko et al. on May 11, 1999, which is hereby incorporated by reference. The air then flows out of the HVAC system 10 through a supply plenum 32. The direction of the air flow is indicated by an arrow 34.

Figure 2A:
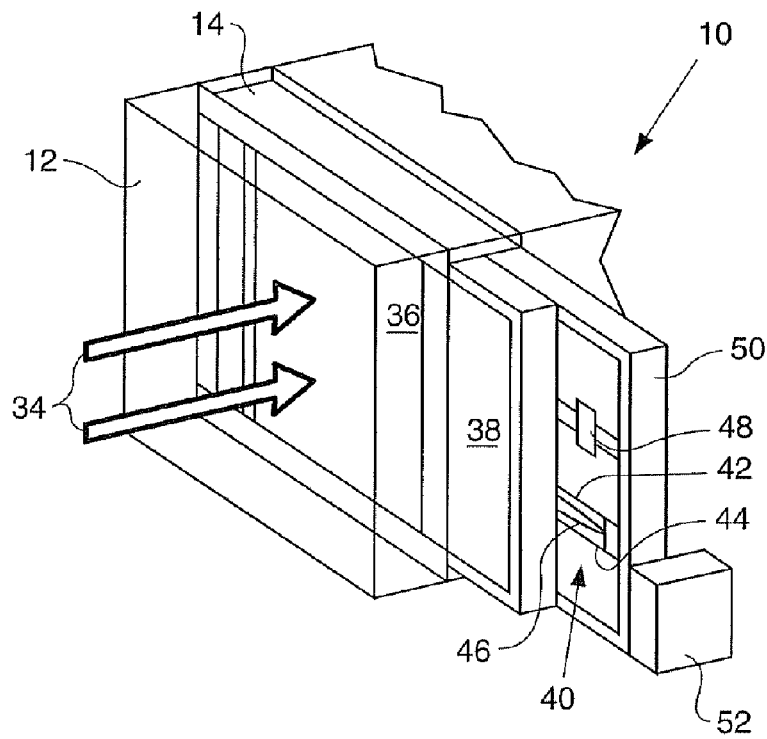
FIG. 2a is an isolated perspective view of the ultraviolet, filtration and sensing mechanism with associated control unit for the inline air handler system in accordance with the present invention.

Referring now to FIG. 2a, the HVAC system 10 is again shown with the air flow, indicated by arrow 34, going into the return air plenum 12. Within the chamber 14 is an ultraviolet, filtration and sensing mechanism of the present invention that is generally indicated by numeral 36. The ultraviolet, filtration and sensing mechanism 36 may be a unitary structure or consist of separate, discrete components.

Figure 3:
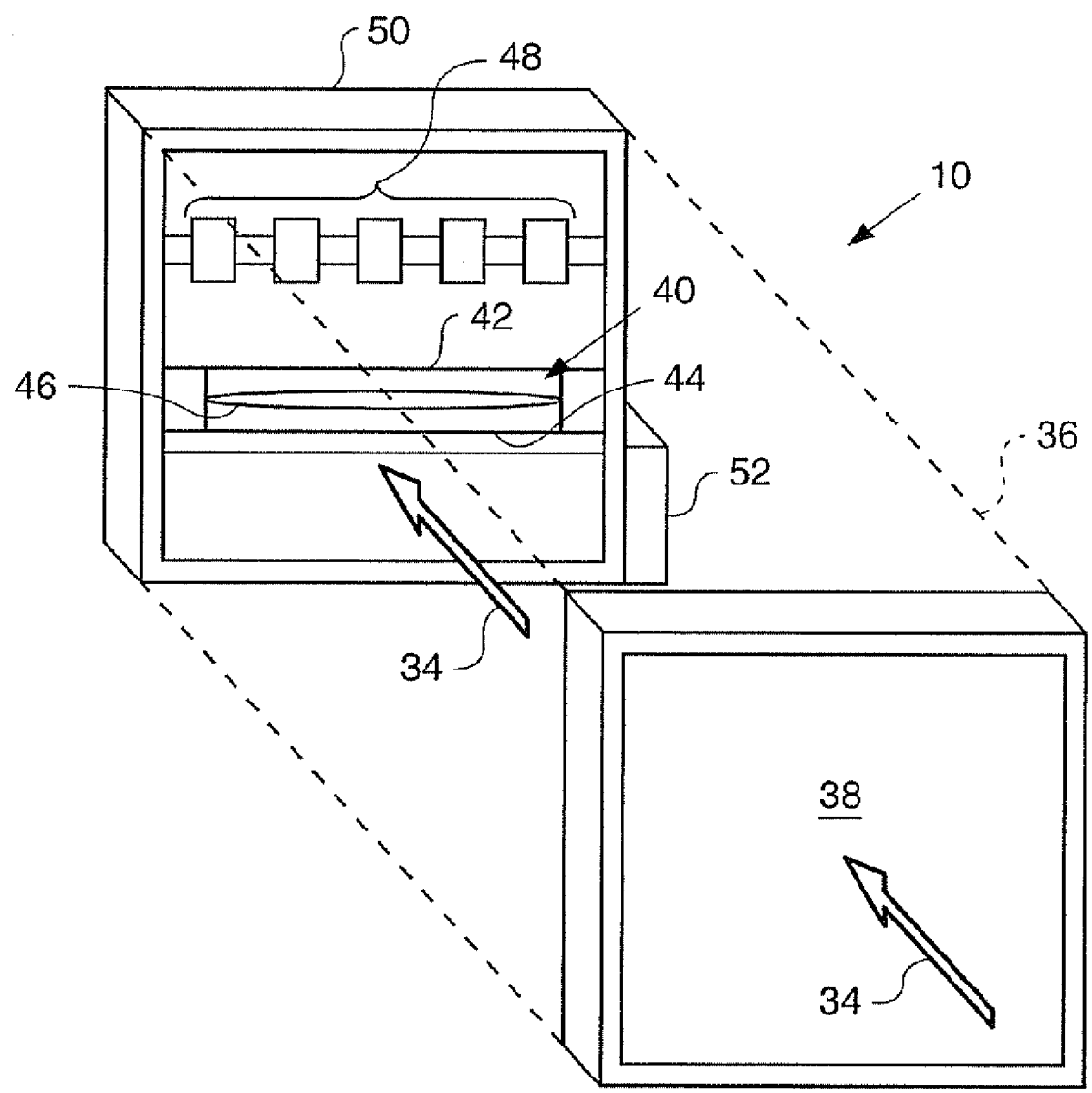
FIG. 3 is an exploded perspective view of an ultraviolet, filtration and sensing mechanism of FIG. 2 associated with the inline air handler system in accordance with the present invention.

Referring now to FIGS. 2a and 3, the ultraviolet, filtration and sensing mechanism 36 includes an air filtration unit 38. This air filtration unit 38 can include virtually any type of air filter, including, but not limited to, a traditional air filter made of paper, fiber, foam, and so forth. This traditional air filter is preferably, but not necessarily, in the form of a mat. The air filtration unit 38 can be electronic, passive electrostatic, active electrostatic, ionic and other types of electrical or electronic air filtration. The air filtration unit 38 can be either a disposable or a reusable filtration type of device.

The ultraviolet, filtration and sensing mechanism 36 preferably includes at least one ultraviolet light 40 to provide germicidal action in the flowing air supply to destroy organisms. Preferably, but not necessarily, there is an upper reflective shield 42 and a lower reflective shield 44 to keep dust and debris off of the ultraviolet light 40. Typically, the ultraviolet light 40 is housed in a tube 46, e.g., glass tube. This is just an illustrative example and a wide variety of protective coatings or enclosures will suffice. An illustrative, but nonlimiting, example of an ultraviolet light for killing germs in an air flow is disclosed in U.S. Pat. No. 6,680,028, which issued to Harris on Jan. 20, 2004, which is hereby incorporated by reference.

As shown in FIGS. 2a and 3, there is at least one sensor that is generally indicated by numeral 48. The at least one sensor 48, e.g., plurality of sensors, can include any of a wide variety of sensors including, but not limited to, humidity, bio-toxins, bacteria, spores, viruses, flammable vapors, carbon monoxide (CO), carbon dioxide ($CO_2$), NOx (which is a generic term for the various oxides produced during combustion), radon, smoke, temperature, static pressure, volumetric flow or vacuum as illustrative examples. Preferably, but not necessarily, a plurality of sensors 48 can be arranged in a spaced relationship forming a pack and is operatively attached to a member 50 such as a frame. An illustrative, but nonlimiting, example of a pressure sensor to provide an indication when the filtration unit is not working effectively is disclosed in U.S. Pat. No. 5,042,997, which issued to Rhodes on Aug. 27, 1991, which is hereby incorporated by reference and is disclosed in U.S. Pat. No. 5,772,732, which issued to James et al. on Jun. 30, 1998, which also is hereby incorporated by reference.

An illustrative, but nonlimiting, example of sensors that detect temperature, humidity, gaseous and particulate pollution levels is disclosed in U.S. Pat. No. 5,531,801, which issued to Sewell et al. on Jul. 2, 1996, which is hereby incorporated by reference and U.S. Pat. No. 5,428,964, which issued to Lobdell, on Jul. 4, 1995, which also is hereby incorporated by reference.

Preferably, the at least one sensor 48 utilizes nanotechnology. Nanotechnology is a branch of engineering that deals with the design and manufacture of extremely small electronic and mechanical devices built at the molecular level of matter. An illustrative, but nonlimiting example, of this type of nanotechnology sensor, e.g., oxygen sensor, is disclosed in U.S. Pat. No. 6,569,518, which issued to Yadav, et al. on May 27, 2003, which is hereby incorporated by reference.

Electrically connected to the at least one sensor 48 and the at least one ultraviolet light 40 is a control unit 52. The control unit 52 preferably includes a processor. A processor referred to herein can be a single processor or a whole series of processors and any variant of a processor such as a computer or a programmable logic controller.

Figure 2B:
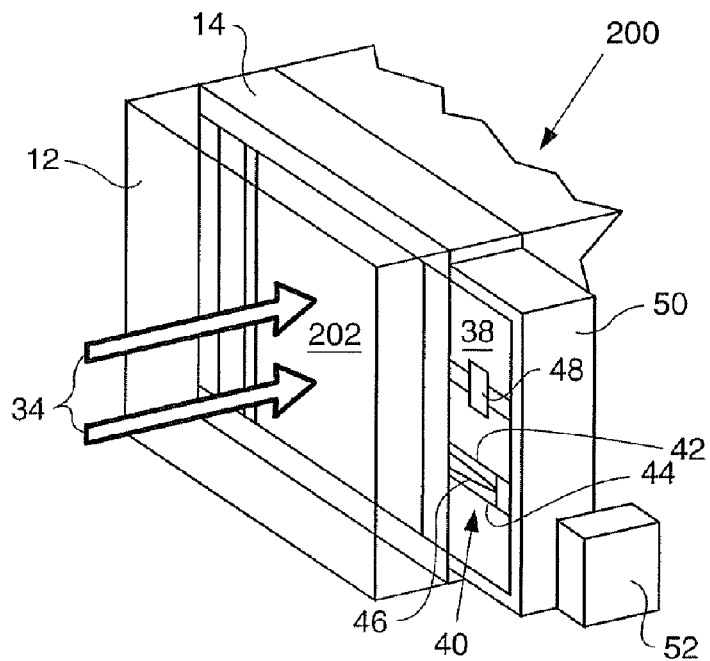
FIG. 2b is an isolated perspective view of a first alternative embodiment of the ultraviolet, filtration and sensing mechanism with associated control unit for the inline air handler system in accordance with the present invention with a combination air filtration and sensing mechanism.

Referring now to FIG. 2b, a first alternative embodiment of the HVAC system 200 is again shown with the air flow, indicated by arrow 34, going into the return air plenum 12. Within the chamber 14 is an ultraviolet, filtration and sensing mechanism of the present invention that is generally indicated by numeral 202. The ultraviolet, filtration and sensing mechanism 202 includes a combination air filtration unit 38 and at least one sensor that is generally indicated by numeral 48. The at least one sensor 48, e.g., plurality of sensors, can include any of a wide variety of sensors including, but not limited to, humidity, bio-toxins, bacteria, spores, viruses, flammable vapors, carbon monoxide (CO), carbon dioxide ($CO_2$), NOx (which is a generic term for the various oxides produced during combustion), radon, smoke, temperature, static pressure, volumetric flow or vacuum as illustrative examples. This combination unit may optionally include at least one ultraviolet light 40 to provide germicidal action in the flowing air supply to destroy organisms. Preferably, but not necessarily, there is an upper reflective shield 42 and a lower reflective shield 44 to keep dust and debris off of the ultraviolet light 40. Typically, the ultraviolet light 40 is housed in a tube 46, e.g., glass tube. This is just an illustrative example and a wide variety of protective coatings or enclosures will suffice. Preferably, the at least one sensor utilizes nanotechnology and is positioned within the air filtration unit 38. Nanotechnology is a branch of engineering that deals with the design and manufacture of extremely small electronic and mechanical devices built at the molecular level of matter. An illustrative, but nonlimiting example, of this type of nanotechnology sensor, e.g., oxygen sensor, is disclosed in U.S. Pat. No. 6,569,518, which issued to Yadav, et al. on May 27, 2003, which is hereby incorporated by reference.

The air filtration unit 38 can include virtually any type of air filter, including, but not limited to, a traditional air filter made of paper, fiber, foam, and so forth. This traditional air filter is preferably, but not necessarily, in the form of a mat. The air filtration unit 38 can be electronic, passive electrostatic, active electrostatic, ionic and other types of electrical or electronic air filtration. The air filtration unit 38 can be either a disposable or a reusable filtration type of device.

The ultraviolet, filtration and sensing mechanism 36 preferably includes at least one ultraviolet light 40 to provide germicidal action in the flowing air supply to destroy organisms. Preferably, but not necessarily, there is an upper reflective shield 42 and a lower reflective shield 44 to keep dust and debris off of the ultraviolet light 40.

Electrically connected to the at least one sensor 48 and the at least one ultraviolet light 40 is a control unit 52. The control unit 52 preferably includes a processor. A processor referred to herein can be a single processor or a whole series of processors and any variant of a processor such as a computer or a programmable logic controller.

Also, in the preferred embodiment, the ultraviolet, filtration and sensing mechanism 36 is able to transmit sensor data and receive commands through a network. In the preferred embodiment, this network would be a wireless communication network. Therefore, the control unit 52 also preferably includes wireless communication mechanism. An illustrative, but nonlimiting example, of this type of wireless communication technology is disclosed in U.S. Pat. No. 6,535,838, which issued to Abraham et al. on Mar. 18, 2003, which is hereby incorporated by reference. However, a dedicated wired network or power line carrier communication network is also possible.

Figure 8:
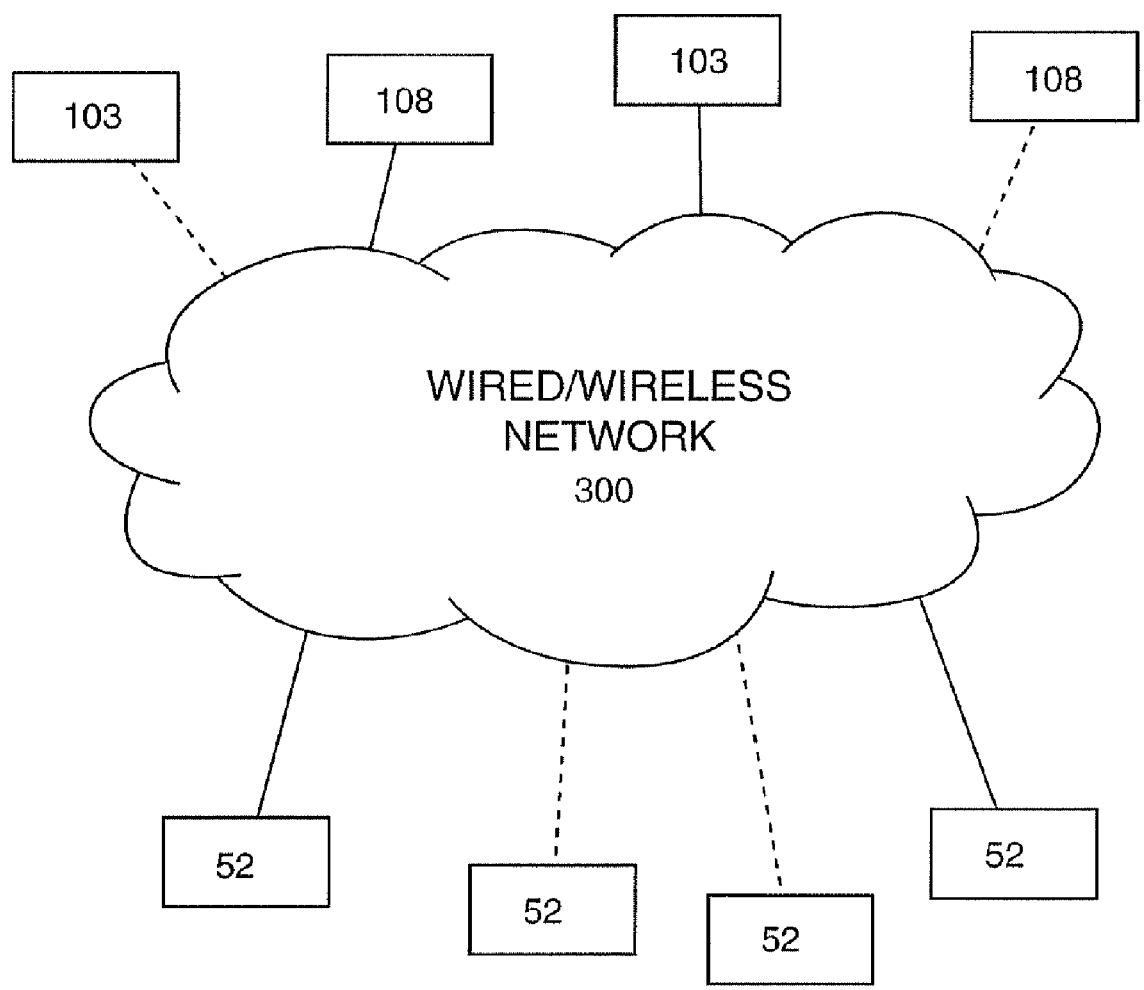
FIG. 8 is a general schematic of a wired and/or wired network interconnecting with at least one input device, at least one output device and at least one the control unit for an inline air handler system in accordance with the present invention.

Referring now to FIG. 8, the transmission of sensor data and receive commands can be accomplished through a computer network 300. Preferably, the computer network is local in nature such as a local area network (LAN). However, a wide area network (WAN) and other types of computer networks are possible. When using a LAN networking environment, the control unit 52 is connected to the LAN through a network interface or adapter. When using a WAN networking environment, the control unit 52 typically includes a modem or other means for establishing communications over the WAN, such as a global computer network e.g., the Internet. The WAN network permits communication to other points or systems with a more comprehensive computer network. The computer network is capable of communicating in a wide variety of methods including, but not limited to, point-to-point, star, mesh or star-mesh architecture. The protocols utilized can include, but are not limited to, proprietary, Internet, contention and polled protocols and their derivatives.

Figure 4:
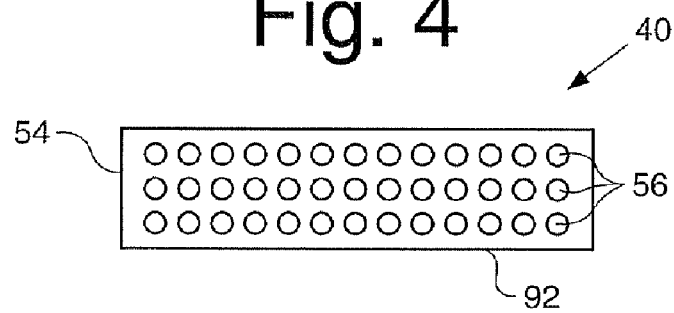
FIG. 4 is a top of an array of ultraviolet light emitting diodes mounted on a flexible circuit board.
Figure 5:
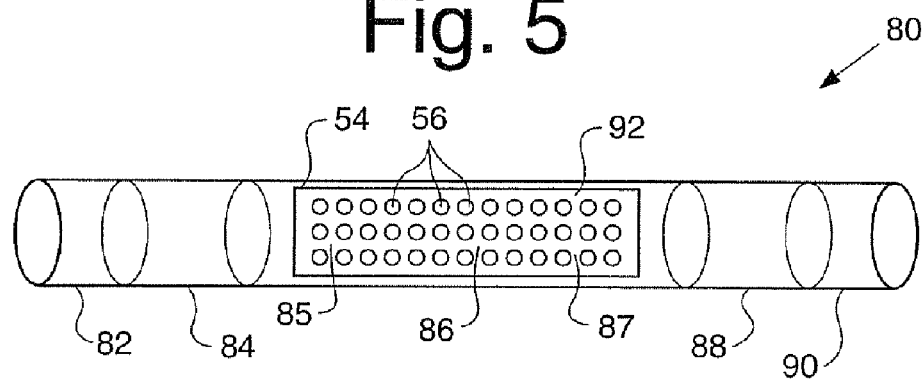
FIG. 5 is a side perspective view of a preferred water filtration unit utilizing an array of ultraviolet light emitting diodes mounted on a flexible circuit board in accordance with the present invention.

Preferably, the at least one ultraviolet light 40 can also be used to purify drinking water. As shown in FIG. 5, a preferred embodiment for the water purification mechanism utilizing ultraviolet light is generally indicated by numeral 80. Referring now to FIG. 4, the at least one ultraviolet light 40 is in the form of an ultraviolet diode array 54. The individual ultraviolet diodes in the ultraviolet diode array 54 are indicated by numeral 56. The ultraviolet diode array is preferably, but not necessarily attached to a flexible circuit board 92. Ultraviolet light emitting diodes are preferred over traditional florescent lighting for a variety of reasons. One reason is that a standard florescent ultraviolet light tube has an average life of 5,000 to 7,000 hours, while an ultraviolet light emitting diode has an average life of 100,000 hours. As such, the use of ultraviolet light emitting diodes 56 in filtration and sanitizing systems will have a huge impact on the cost of maintenance for such systems by altering the replacement cycle from approximately once every nine (9) months to once every fifteen (15) years.

Referring again to FIG. 5, there is a plumbing inlet that is generally indicated by numeral 82. There is a first manifold 84 that connects a first portion 85 of an ultraviolet radiation chamber 86 to the plumbing inlet 82. Preferably, the ultraviolet radiation chamber 86 is made of transparent material such as, but not limited to glass, plastic, and composites. The ultraviolet radiation chamber 86 is positioned adjacent, and preferably encircled by, the ultraviolet diode array 54 mounted on the flexible circuit board 92 for providing germicidal action on the water passing through the ultraviolet radiation chamber 86 to kill both bacteria and viruses. However, the ultraviolet diode array 54 may be positioned internally within the ultraviolet radiation chamber 86.

This ultraviolet light source is totally flexible in its design so that there is an injection of light from the outside of the ultraviolet radiation chamber 86 to the inside of the ultraviolet radiation chamber 86. The ultraviolet radiation chamber 86 includes a second portion 87 that is connected to a second manifold 88. The second manifold 88 is connected to a plumbing outlet 90. The plumbing inlet 82 and the plumbing outlet 90 can include any type of plumbing or piping that can be utilized in a building or premises utilizing all of the wide variety of materials that can be used therewith. The first manifold 84 and the second manifold 88 provide a transition mechanism between the ultraviolet radiation chamber 86 and the plumbing inlet 82 and the plumbing outlet 90, respectively. This type of ultraviolet sanitation is low cost, low maintenance and uses very little electrical power.

An additional feature of utilizing ultraviolet light emitting diodes 56 is that their output can be focused using optical light guiding encapsulation technologies during manufacturing which pinpoints all of their output into the ultraviolet radiation chamber 86. This technique, unlike traditional florescent tube designs, provides a higher level of penetration of ultraviolet radiation through the use of focused beam technology.

An additional flexibility in the design of the ultraviolet radiation chamber 86 is the ability to mold the ultraviolet light emitting diodes 56 directly into the ultraviolet radiation chamber 86. It would include the molding of the ultraviolet light emitting diodes 56 directly into the surface of the ultraviolet radiation chamber 86 and making them an integral part of the ultraviolet radiation chamber 86 and can include the flexible circuit board 92 as associated connectors (not shown) as well. This method would integrate the ultraviolet light emitting diodes 56 to the ultraviolet radiation chamber 86 so that ultraviolet light would fully penetrate the ultraviolet radiation chamber 86. This method would provide the best overall penetration of the ultraviolet radiation into the ultraviolet radiation chamber 86 and the water being purified but does make maintenance of the array of ultraviolet light emitting diodes 56 more difficult in that it would require replacing the entire ultraviolet radiation chamber 86 when the ultraviolet light emitting diodes 56 eventually failed.

A light emitting diode 56 when utilized as the at least one ultraviolet light 40 would have applicability for both water and air. For example, light emitting diodes 56 would have applicability in items like water filters, air filtration and air movement systems like central air conditioning systems, window air conditioning systems, cloths dryers, automotive air conditioning systems, pond filtration systems, cooling towers for chillers (where costly algaecides and bacterial prevention chemicals must be used), public and private swimming pool filtration systems, water parks, amusement centers, drinking fountains, chilled water dispensers, under-the-counter filtration units, refrigerator water dispensers and ice makers, among numerous other air and water purification applications.

One source for ultraviolet light emitting diodes 56 would include III-N technology, Inc. An illustrative, but nonlimiting example of ultraviolet light emitting diodes is disclosed in U.S. Pat. No. 6,765,396, which issued to Barror on Jul. 20, 2004, which is hereby incorporated by reference and in U.S. Patent Application No. 20040075065, which was published for Spivak on Apr. 22, 2004, which also is hereby incorporated by reference.

Figure 6:
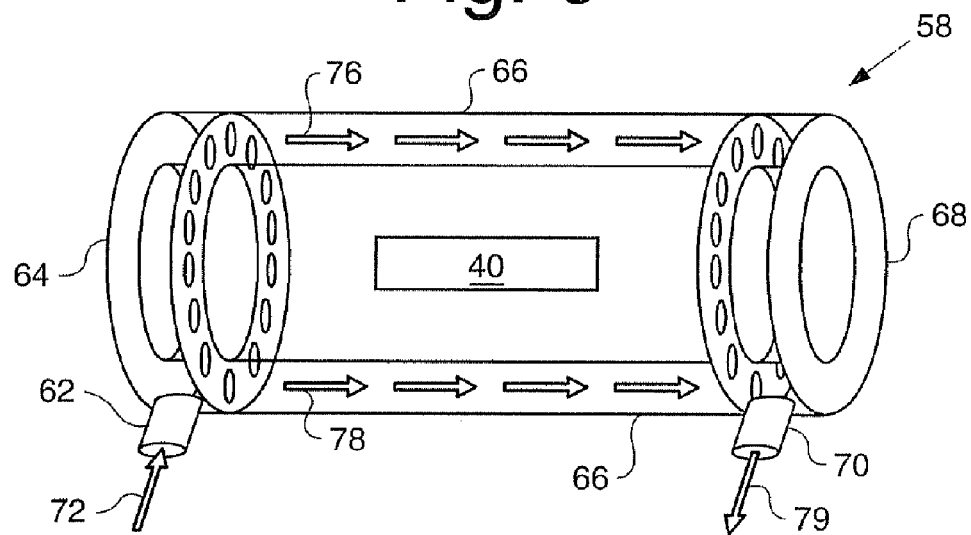
FIG. 6 is a side view of an alternative embodiment of a water filtration unit utilizing a jacket surrounding an ultraviolet light in accordance with the present invention.

Referring now to FIG. 6, an alternative embodiment of a water purification mechanism is indicated by numeral 58. This includes a jacket 66 that is capable of receiving water from an inlet 62. The water then enters a first manifold 64 so that is can pass around the outside of the at least one ultra violet light 40 through a jacket 66. From the jacket 66, the water exits through a second manifold 68. The water then leaves the second manifold 68 through an outlet 70. The jacket 66 is connected at each end to the first manifold 64 and the second manifold 68, respectively. Preferably, the first manifold 64, the jacket 66 and the second manifold 68 and are made of transparent material such as glass, plastic, composites and other types of transparent material. As water enters the inlet 62, as indicated by a first arrow 72, the water passes into the first manifold 64 and then flows through the jacket 66 as indicated by second arrow 76 and third arrow 78, respectively. As the water is flowing through the jacket 66, the light from the at least one ultraviolet light 40 radiates the water for germicidal purposes to kill bacteria and viruses in the water. The water then enters the second manifold 68 and passes out the outlet 70 as indicated by a fourth arrow 79. Preferably, but not necessarily, the water is already purified through filtration before the water enters the inlet 62. The jacket 66 is preferably enclosed by material to keep the ultraviolet radiation from leaving the jacket 66. An illustrative material for enclosing the jacket 66 is preferably metal, e.g., stainless steel. This is preferred since the ultraviolet light 40 can be harmful to the human eye.

Figure 7:
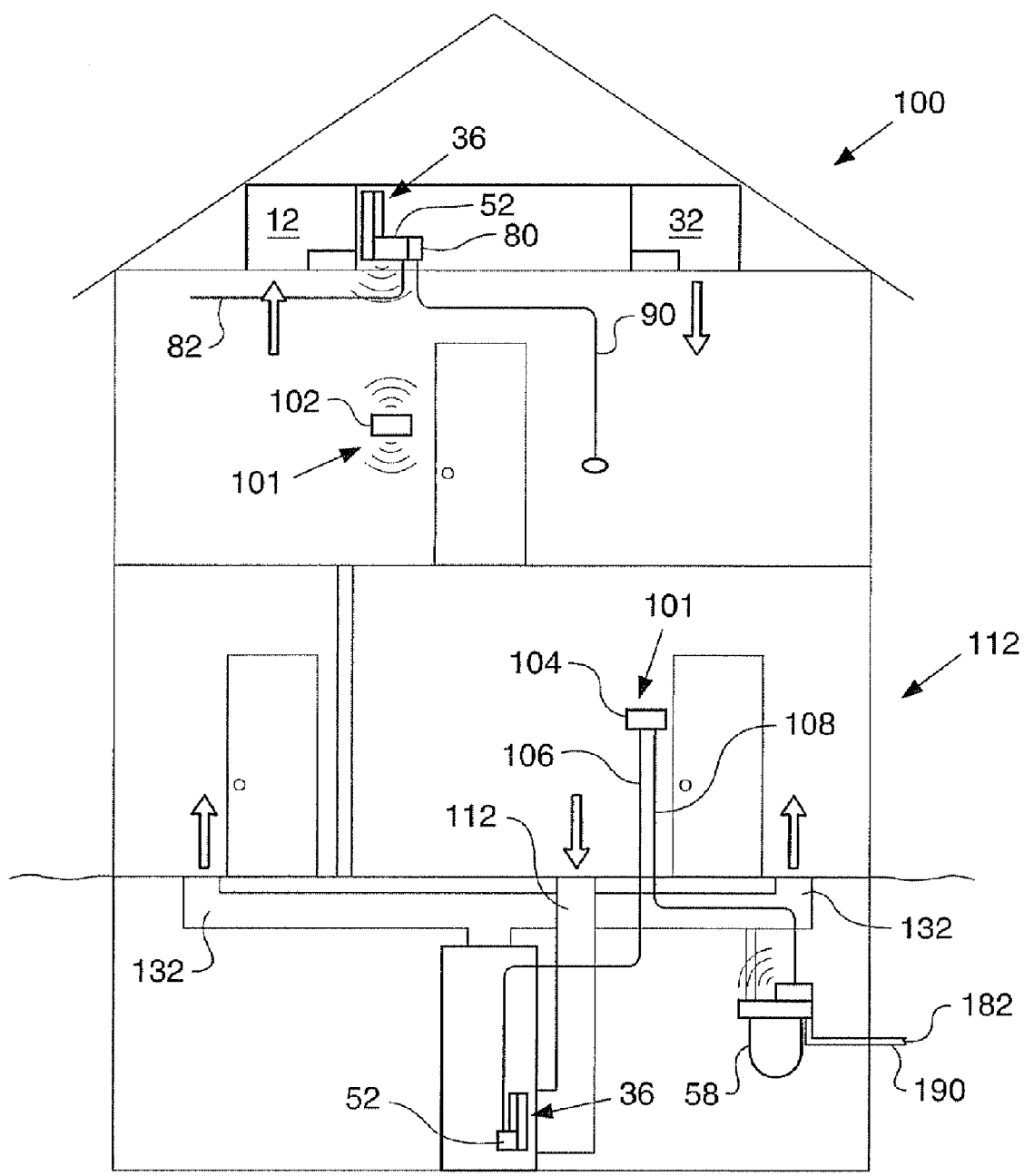
FIG. 7 is a general schematic of a building with various components of the inline air handler system in accordance with the present invention.

Referring now to FIG. 7, an illustrative building or premises utilizing the invention of the present invention is generally indicated by numeral 100. In the upper portion 110 of the building or premises 100, the air flows into the return air plenum 12 and then passes into the ultraviolet, filtration and sensing mechanism 36 and then out of the supply plenum 32. Preferably, the ultraviolet, filtration and sensing mechanism 36 includes the ultraviolet water purification mechanism 80 which are both connected in wireless communication through the control unit 52 to an electronic display with an input device and an output device 101, e.g., radio frequency, wireless thermostat. The ultraviolet water purification mechanism 80 receives water from the plumbing inlet 82 and dispenses germicidally cleansed water through the plumbing outlet 90.

In the lower portion 112 of the building or premises with a less preferred embodiment, the air flows into the return air plenum 112 and then passes into the ultraviolet, filtration and sensing mechanism 36 and then out of a dual air supply plenum 132. The ultraviolet, filtration and sensing mechanism 36 is separate from the ultraviolet water purification mechanism 80. The ultraviolet, filtration and sensing mechanism 36 through the control unit 52 is electrically connected by a first electrical conductor 106 to an electronic display with an input device and an output device 101, e.g., wired thermostat 104. The wired thermostat 104 is electrically connected by a second electrical conductor 108 to the ultraviolet water purification mechanism 58. The ultraviolet water purification mechanism 58 receives water from the plumbing inlet 182 and dispenses germicidally cleansed water from the plumbing outlet 190.

Although thermostats 102 and 104 are illustrated, virtually any type of electronic output device 103 and electronic input device 108 will suffice, as shown in FIG. 8. Preferably, but not necessarily, the electronic output device 103 includes an electronic display. Although a liquid crystal diode display is preferred for the electronic display, a cathode ray tube, a plasma screen and virtually any other type of electronic display will suffice. The electronic display can be hard wired, portable or in wireless connection with the control unit 52 and any combination thereof.

The electronic output device 103 can also include an alarm to detect abnormal operating conditions or failures on part of the subsystems that can be visual or audible or both visual and audible. The alarm can be both local or over a computer network 300. If the alarm is over a computer network 300 then nodes on the computer network 300 will be able to visually or audibly indicate the alarm condition through controlled systems, subsystems and processes. Use of a wide area network, WAN, will permit safety and lower level alarm conditions to reach nodes that can provide an emergency response, monitoring services, owners, operators, repair and servicing organizations, and so forth. In premise nodes, such as that found on a local area network, LAN, the electronic display and input/output device can include, in addition to a thermostat 102 and 104, appliances, messaging terminals, personal computers, televisions, auxiliary smoke and fire monitors and alarm mechanisms, and so forth.

An electronic input device 108 can include any type of pushbutton entry system including, but not limited to, a keyboard, voice recognition, and so forth. This can include, but is not limited to, a television set interface, security alarm display, global computer network enabled appliance, e.g., web appliance, telephone, personal digital assistant ("PDA"), home control interface and a wide variety of devices that use Wireless Application Protocol ("WAP"). WAP is a secure specification that allows users to access information instantly via handheld wireless devices. The electronic input device 108 can provide input to operate various components within an HVAC system 10, as shown in FIG. 1, such as the driven air chamber 16, e.g., an air propulsion mechanism 18, a heating chamber 20, e.g., a gas-fired heating unit 22, a cooling chamber 24, e.g., an evaporator coil 26, and an auxiliary heating chamber 28, e.g., resistive heating elements 30. Also, these same components and/or subsystems can be monitored and with the status displayed on the electronic output device 103.

The preferred embodiment of the present invention and the method of using the same has been described in the foregoing specification with considerable detail, it is to be understood that modifications may be made to the invention which do not exceed the scope of the appended claims and modified forms of the present invention performed by others skilled in the art to which the invention pertains will be considered infringements of this invention when those modified forms fall within the claimed scope of this invention.

What is claimed is:

1. An inline air handler system comprising:
a member;
at least one sensor operatively attached to the member;
at least one ultraviolet light operatively attached to the member;
at least one electronic input device;
at least one electronic output device;
a control unit, which includes a processor, that is electronically in communication with the at least one sensor, the at least one ultraviolet light, the at least one electronic input device and the at least one electronic output device; and
an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof.

2. The inline air handler system as set forth in claim 1, wherein the air system includes a return air plenum and a supply air plenum with the chamber located between the return air plenum and the supply air plenum.

3. The inline air handler system as set forth in claim 1, wherein the air system includes a return air plenum, a driven air chamber, a heating chamber, a cooling chamber and a supply air plenum with the chamber located between the return air plenum and the driven air chamber.

4. The inline air handler system as set forth in claim 3, wherein the driven air chamber includes an air propulsion mechanism, the heating chamber includes a gas-fired heating unit, and the cooling chamber includes an evaporator coil.

5. The inline air handler system as set forth in claim 3, further includes an auxiliary heating chamber with resistive heating elements, which is located between the evaporator coil and the supply air plenum.

6. The inline air handler system as set forth in claim 1, wherein the at least one sensor includes at least one humidity sensor.

7. The inline air handler system as set forth in claim 1, wherein the at least one sensor includes at least one biological sensor.

8. The inline air handler system as set forth in claim 7, wherein the at least one biological sensor is selected from the group consisting of a bio-toxin sensor, a bacteria sensor, a spore sensor and a virus sensor.

9. The inline air handler system as set forth in claim 1, wherein the at least one sensor includes at least one air sensor.

10. The inline air handler system as set forth in claim 9, wherein the at least one air sensor is selected from the group consisting of a flammable vapor sensor, a carbon monoxide sensor, a carbon dioxide sensor, a NOx sensor, a radon sensor and a smoke detector.

11. The inline air handler system as set forth in claim 1, wherein the at least one sensor includes at least one air flow sensor.

12. The inline air handler system as set forth in claim 11, wherein the at least one air flow sensor is from the group consisting of a static pressure sensor, a vacuum sensor and a volumetric flow sensor.

13. The inline air handler system as set forth in claim 1, wherein the at least one sensor includes at least one temperature sensor.

14. The inline air handler system as set forth in claim 1, wherein the air filtration unit is selected from the group consisting of paper, fibrous, foam, electronic, passive electrostatic, active electrostatic and ionic types of filters.

15. The inline air handler system as set forth in claim 1, wherein the at least one ultraviolet light includes a plurality of light emitting diodes.

16. The inline air handler system as set forth in claim 15, wherein the plurality of light emitting diodes are mounted on a flexible electrical circuit board.

17. The inline air handler system as set forth in claim 1, further comprising a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber to allow water to flow between the inlet and the outlet through the ultraviolet radiation chamber, wherein the ultraviolet radiation chamber is positioned adjacent to the at least one ultraviolet light.

18. The inline air handler system as set forth in claim 17, wherein the at least one ultraviolet light includes a plurality of light emitting diodes.

19. The inline air handler system as set forth in claim 18, wherein the plurality of light emitting diodes are mounted on a flexible electrical circuit board.

20. The inline air handler system as set forth in claim 19, wherein the flexible electrical circuit board at least partially surrounds the ultraviolet radiation chamber.

21. The inline air handler system as set forth in claim 19, wherein the flexible electrical circuit board is located within the ultraviolet radiation chamber.

22. The inline air handler system as set forth in claim 18, wherein the plurality of light emitting diodes are integral to the ultraviolet radiation chamber.

23. The inline air handler system as set forth in claim 17, wherein the ultraviolet radiation chamber is a transparent tube with the at least one ultraviolet light positioned on the outside of the transparent tube.

24. The inline air handler system as set forth in claim 17, wherein the ultraviolet radiation chamber is a transparent jacket that allows fluid flow on the outside of the at least one ultraviolet light that is positioned within the transparent jacket.

25. The inline air handler system as set forth in claim 17, further comprising a first manifold connected between the inlet and the ultraviolet radiation chamber and a second manifold connected between the ultraviolet radiation chamber and the outlet.

26. The inline air handler system as set forth in claim 17, further comprising an upper reflective shield positioned above the at least one ultraviolet light and a lower reflective shield positioned below the at least one ultraviolet light.

27. The inline air handler system as set forth in claim 1, wherein the at least one electronic output device includes an electronic display.

28. The inline air handler system as set forth in claim 1, wherein the at least one electronic output device is in electronic communication with the control unit in a group consisting of wired communication, wireless communication, power line carrier and any combination thereof.

29. The inline air handler system as set forth in claim 1, wherein the at least one electronic output device includes an audible alarm.

30. The inline air handler system as set forth in claim 1, wherein the at least one electronic input device is in electronic communication with the control unit in a group consisting of wired communication, wireless communication, power line carrier and any combination thereof.

31. The inline air handler system as set forth in claim 1, wherein the at least one electronic input device is selected from the group consisting of an electronic thermostat, at least one pushbutton, voice recognition, a television set interface, a security alarm display, a global computer network enabled appliance, telephone, personal digital assistant, home control interface and a Wireless Application Protocol enabled device.

32. The inline air handler system as set forth in claim 1, wherein the control unit is in electronic communication with an electronic display and input device through a network.

33. The inline air handler system as set forth in claim 32, wherein the control unit is in electronic communication with an electronic display and input device through wireless communication to the network.

34. The inline air handler system as set forth in claim 32, wherein the network is selected from the group consisting of a local area network or a wide area network wherein a network communication architecture is selected from the group consisting of point-to-point, star, mesh or star-mesh with protocols selected from the group consisting of proprietary, Internet, contention, polled or derivatives thereof.

35. The inline air handler system as set forth in claim 1, wherein the control unit is in electronic communication with an electronic display and input device through wireless communication.

36. An inline air handler system comprising:
a member;
at least one sensor;
at least one ultraviolet light operatively attached to the member;
at least one electronic input device;
at least one electronic output device;
a control unit, which includes a processor, that is electronically in communication with the at least one sensor, the at least one ultraviolet light, the at least one electronic input device and the at least one electronic output device; and
an air filtration unit, wherein the air filtration unit and the member are positioned in a chamber located within an air system selected from the group consisting of a heating system, a ventilation system, an evaporative cooling system and an air conditioning system and combinations thereof and the air filtration unit is positioned within the member and the at least one sensor is positioned within the air filtration unit.

37. The inline air handler system as set forth in claim 36, wherein the at least one sensor utilizes nanotechnology.

38. An inline air handler system comprising:
a member;
at least one sensor operatively attached to the member;
at least one ultraviolet light operatively attached to the member;
at least one electronic input device;
at least one electronic output device;
a control unit, which includes a processor, that is electronically in communication with the at least one sensor, the at least one ultraviolet light, the at least one electronic input device and the at least one electronic output device;
a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber to allow water to flow between the inlet and the outlet through the ultraviolet radiation chamber, wherein the ultraviolet radiation chamber is positioned adjacent to the at least one ultraviolet light; and
an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof.

39. The inline air handler system as set forth in claim 38, wherein the at least one sensor is selected from the group consisting of a humidity sensor, a bio-toxin sensor, a bacteria sensor, a spore sensor, a virus sensor, a flammable vapor sensor, a carbon monoxide sensor, a carbon dioxide sensor, a NOx sensor, a radon sensor, a smoke detector, a static pressure sensor, a vacuum sensor, an air volumetric sensor and a temperature sensor.

40. A method for utilizing an inline air handler system comprising:
utilizing at least one sensor operatively attached to a member;
utilizing at least one ultraviolet light operatively attached to the member;
providing input through at least one electronic input device;
filtering air through an air filtration unit positioned adjacent to the at least one sensor and the at least one ultraviolet light, wherein the air filtration unit and the member are positioned in a chamber located within an air system selected from the group consisting of a heating system, a ventilation system an evaporative cooling system and an air conditioning system, and combinations thereof; and
receiving output with at least one electronic output device, wherein a control unit, which includes a processor, is electronically in communication with the at least one sensor, the at least one ultraviolet light, the at least one electronic input device and the at least one electronic output device.

41. The method for utilizing an inline air handler system as set forth in claim 40, wherein utilizing the at least one sensor operatively attached to a member includes utilizing at least one sensor selected from the group consisting of a humidity sensor, a bio-toxin sensor, a bacteria sensor, a spore sensor, a virus sensor, a flammable vapor sensor, a carbon monoxide sensor, a carbon dioxide sensor, a NOx sensor, a radon sensor, a smoke detector, a static pressure sensor, a vacuum sensor, an air volumetric sensor and a temperature sensor.

42. The method for utilizing an inline air handler system as set forth in claim 40, wherein the filtering air through an air filtration unit includes utilizing an air filtration unit selected from the group consisting of paper, fibrous, foam, electronic, passive electrostatic, active electrostatic and ionic types of filters.

43. The method for utilizing an inline air handler system as set forth in claim 40, further comprising filtering water through a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber thereby allowing water to flow between the inlet and the outlet through the ultraviolet radiation chamber, wherein the ultraviolet radiation chamber is positioned adjacent to the at least one ultraviolet light.

44. The method for utilizing an inline air handler system as set forth in claim 40, wherein the providing input through at least one electronic input device includes an input device selected from the group consisting of at least one pushbutton, voice recognition, an electronic thermostat, a television set interface, a security alarm display, a global computer network enabled appliance, telephone, personal digital assistant, home control interface and a Wireless Application Protocol enabled device.

45. The method for utilizing an inline air handler system as set forth in claim 40, wherein the receiving output with at least one electronic output device includes an electronic output device consisting of an audible alarm and an electronic display and wherein the control unit is in electronic communication with the electronic output device through a group consisting of wired communication, wireless communication, power line carrier, at least one wired network, at least one wireless network and any combination thereof.

46. The method for utilizing an inline air handler system as set forth in claim 45, wherein the network is selected from the group consisting of a local area network or a wide area network and a network communication architecture selected from the group consisting of point-to-point, star, mesh or star-mesh with protocols selected from the group consisting of proprietary, Internet, contention, polled or derivatives thereof.

47. The method for utilizing an inline air handler system as set forth in claim 40, wherein the at least one sensor utilizes nanotechnology.

48. A method for utilizing an inline air handler system comprising:
 utilizing at least one sensor;
 utilizing at least one ultraviolet light operatively attached to the member;
 providing input through at least one electronic input device;
  filtering air through an air filtration unit, wherein the air filtration unit and the member are positioned in a chamber located within an air system selected from the group consisting of a heating system, a ventilation system an evaporative cooling system and an air conditioning system, and
 combinations thereof, wherein the air filtration unit is positioned within the member and the at least one sensor is positioned within the air filtration unit; and receiving output with at least one electronic output device, wherein a control unit, which includes a processor, is electronically in communication with the at least one sensor, the at least one ultraviolet light, the at least one electronic input device and the at least one electronic output device.

49. A method for utilizing an inline air handler system comprising:
 utilizing at least one sensor operatively attached to a member, wherein the at least one sensor is selected from the group consisting of a humidity sensor, a bio-toxin sensor, a bacteria sensor, a spore sensor, a virus sensor, a flammable vapor sensor, a carbon monoxide sensor, a carbon dioxide sensor, a NOx sensor, a radon sensor, a smoke detector, a static pressure sensor, a vacuum sensor and a temperature sensor;
 utilizing at least one ultraviolet light operatively attached to the member; providing input through at least one electronic input device;
 filtering air through an air filtration unit positioned adjacent to the at least one sensor and the at least one ultraviolet light, wherein the air filtration unit and the member are positioned in a chamber located within an air system selected from the group consisting of a heating system, a ventilation system, an evaporative cooling system and an air conditioning system, and combinations thereof and the air filtration unit is selected from the group consisting of paper, fibrous, foam, electronic, passive electrostatic, active electrostatic and ionic types of filters;
 receiving output from at least one electronic output device, wherein a control unit, which includes a processor, is electronically in communication with the at least one sensor, the at least one ultraviolet light, the at least one electronic input device and the at least one electronic output device; and
 filtering water through a water purification mechanism that includes an inlet, an ultraviolet radiation chamber, and an outlet, wherein the inlet is connected in fluid relationship to the ultraviolet radiation chamber and the outlet is connected in fluid relationship to the ultraviolet radiation chamber thereby allowing water to flow between the inlet and the outlet through the ultraviolet radiation chamber, wherein the ultraviolet radiation chamber is positioned adjacent to the at least one ultraviolet light.

* * * * *